United States Patent
Stedman et al.

(10) Patent No.: US 6,599,070 B1
(45) Date of Patent: Jul. 29, 2003

(54) CARGO STABILIZER

(76) Inventors: Kevin M. Stedman, 1302 27th St. Ct. NW., Gig Harbor, WA (US) 98335; Pauline J. Stedman, 1302 27th St. Ct. NW., Gig Harbor, WA (US) 98335

( * ) Notice: Subject to any disclaimer, the term of this patent is extended or adjusted under 35 U.S.C. 154(b) by 33 days.

(21) Appl. No.: 10/047,414

(22) Filed: Jan. 15, 2002

Related U.S. Application Data

(60) Provisional application No. 60/262,342, filed on Jan. 19, 2001.

(51) Int. Cl.[7] .................................................. B60P 7/15
(52) U.S. Cl. ..................... 410/143; 410/121; 410/145; 410/151
(58) Field of Search ................................ 410/121, 143, 410/145, 151, 152; 248/351

(56) References Cited

U.S. PATENT DOCUMENTS

| | | | |
|---|---|---|---|
| 4,434,970 A | | 3/1984 | Boland et al. |
| 5,219,251 A | | 6/1993 | Kanczuzewski .......... 410/127 |
| 5,934,850 A | * | 8/1999 | Soumar et al. ............ 410/155 |
| 5,971,685 A | * | 10/1999 | Owens ....................... 410/151 |
| 5,988,962 A | | 11/1999 | Santa Cruz et al. ........ 410/151 |
| 5,997,228 A | * | 12/1999 | Potter ......................... 410/155 |
| 6,042,312 A | * | 3/2000 | Durham, II ................. 410/143 |
| 6,068,433 A | * | 5/2000 | Baloga ....................... 410/145 |
| 6,086,299 A | | 7/2000 | Kanczuzewski ............ 410/152 |
| 6,238,154 B1 | * | 5/2001 | DaPrato ..................... 410/151 |

OTHER PUBLICATIONS

Pacific Cargo Control, 2000, Brochure pp. IV 8 and 9.
Overnite Transportation, 2001.
Sunrise MFG, 2001.

* cited by examiner

*Primary Examiner*—Stephen T. Gordon

(57) ABSTRACT

The pallet stabilizer frame when combined with a pre-existing, load-bar it will prevent pallets and freight from shifting laterally during shipping. It is comprised of a frame 20, internal support bars 22, pressure point plate 24, extension tubing 24, attached latching 30 pin 28, and load-bar bracing system (not shown). The pallet stabilizer prevents freight from falling laterally by extending into the pocket of space and across to the opposing wall. The frame rest against the freight and inserts into a load-bar system that telescopically extends and is held in place by tension. The pallet stabilizer is easy to use, reusable, no tools are needed and it can be disassembled when not in use.

2 Claims, 1 Drawing Sheet

CARGO STABILIZER

CROSS-REFERENCE TO RELATED APPLICATION

This application claims the benefit of Provisional Patent Application Ser. No. 60/262,342 filed Jan. 19, 2001.

CROSS-REFERENCES TO RELATED APPLICATIONS

U.S. Patent Documents

| | | |
|---|---|---|
| 4434970 | March 1984 | Boland & Kresky |
| 5988962 | April 1998 | Santa Cruz & Moore |
| 5219251 | October 1992 | Kanczuzewski |
| 6086299 | July 1997 | Kanczuzewski |

Overnite Transportation Company 1000 Semmes Ave. Richmond, Va. 23218 Pacific Cargo Control INC Brochure; 2000, page IV-8 and 9 Sunrise Manufacturing Inc. 11389 Trade Center Dr. Rancho Cordova, Calif. 95742

BACKGROUND

1. Field of Invention

This invention relates to securing pallets of freight in cargo compartments with opposing walls.

2. Description of Prior Art

A significant amount of goods are transported using box-type cargo compartments mobilized by trains, semi-trailers, vans and trucks. These goods come packaged in numerous shapes and sizes. During transport freight needs to be secured or packed tightly to prevent shifting and damaging of merchandise. Freight does not always fit the exact dimension of compartments. Frequent pick up and/or delivery stops leave pockets of space creating a need for devices to keep freight from shifting. Whether its across town or across the country, a vehicle with a cargo compartment will transport the merchandise.

Many items have been developed to decrease and prevent shifting of freight in trailers. The adjustable load-bracing bar, U.S. Pat. No. 4,434,790 to Boland (1984) and the cargo load-lock U.S. Pat. No. 5,219,251 to Kanczuzewski (1992) are some of the current patents with re-usable methods in securing freight in cargo compartments.

Several other types of adjustable load-bars, also known as, load-locks, load-bar bracing systems and jack-bars are public knowledge and freely manufactured. Pacific Cargo Control presents some of these tools in their brochure. The load-bar employs telescopically by interconnected portions and extends by a tooth track jack. This lengthens and secures the bar across a compartment wall, preventing freight from shifting forward or backwards. The load-bar tool is not designed to secure freight from lateral shifting.

A hoop set shown in the brochure from "Pacific Cargo Control" and the accessory lock device from U.S. Pat. No. 5,988,962 to Santa Cruz and Moore (1998) are attachment pieces that work with many manufactured load-bar systems. These tools used with a placed load-bar can assist in securing a larger area of freight from shifting forwards and backwards. These types of tools are attached on the bar at a location of choice. However, they are not designed to specifically prevent lateral shifting of freight into a pocket of space. These tools require assembly, have small, unattached parts that can easily be lost, and need additional tools to utilize. These attachment tools are also not time-efficient for frequent use. Unlike these attachment tools the pallet stabilizer is unique because it attaches to the end of a shorter load-bar. This specifically prevents lateral shifting into a pocket of space. The pallet stabilizer is designed for use during frequent shifting of freight due to the many pick-ups and deliveries some companies perform daily.

Another ill-fated solution would be to use a shorter load-bar to prevent freight from sideways. This method is not efficient because the ends of load-bars are generally a four-inch squared rubber pad. The end is not large enough to prevent the freight from falling.

D-rings are another way freight is being restrained. Overnite Transportation has implemented these metal rings. They are attached to the interior walls of cargo compartments. Rope or straps insert through the ring and tie or wrap around the freight. Often the strap or rope cuts through shrink-wrapped pallets resulting in fallen freight. Other difficulties arise from the freight blocking the rings preventing attachment and release of the strap and rope. Another problem is that freight does not always line up with a D-ring. Drivers that pick up and deliver freight daily cut the rope to release the freight. Finding extra rope or additional straps is a common problem.

Sunrise Manufacturing Inc. shows another product used to secure cargo. Air bags can be positioned in a pocket of space and then inflated to prevent freight movement. The air bags vary in size and expand to fit the empty space. This is not functional or cost-effective for freight companies that deliver products daily. Frequent movement and shifting of freight throughout the day would require use of several air bags. This affects costs and creates waste disposal concerns because the air bags are not reusable.

Disposable load restraints as in U.S. Pat. No. 6,086,299 to Kanczuzewski (1997) is one of many other disposal mechanisms for limiting the shifting of cargo in a trailer. Companies that pick up and deliver freight daily find it expensive to utilize disposable methods. These are some of the methods used to keep freight from shifting. Companies that pick-up and deliver freight daily have a need for a tool that specifically prevents lateral movement. The pallet stabilizer in addition to being novel is also an easy, reusable, cost-effective tool that meets this need.

SUMMARY

In accordance with the present invention a freight securing attachment tool comprising a frame, internal center support bars, pressure point plate, extension tubing and an attached removable safety pin is disclosed.

OBJECTS AND ADVANTAGES

Accordingly, besides the objects and advantages of securing pallets of freight and other freight from shifting sideways or laterally in cargo compartments with opposing side walls, several other advantages and objects of the present invention are:

(a) to provide an attachment tool to be used with a pre-existing adjustable load-bar system;

(b) to provide an attachment tool to be used with different types of pre-existing load-bar systems;

(c) to provide a frame that will allow conversion to a taller or wider stabilizing perimeter;

(d) to provide an attachment tool that can be utilized to stabilize a load in any location with in a cargo container;

(e) to provide an easy reusable, and portable tool;

(f) to provide a tool made of simple construction that requires no tools;

(g) to provide an inexpensive means to manufacture with the suitable use of engineering choice, such as, metal, steel or aluminum or the like rigid materials;

(h) to economically provide a means to limit freight damage and employee time used to shift or re-stack cargo;

(i) to provide storage in full cargo compartments by allowing disassembling when needed.

Still further objects and advantages will become apparent from a consideration of the ensuing description and drawings.

DRAWING FIGURES

REFERENCE NUMERALS IN DRAWINGS

| | |
|---|---|
| 20 frame | 22 internal support bars |
| 24 pressure point plate | 26 extension tubing |
| 28 pin | 30 safety latch |
| 32 attachment wire | 34 clamp |
| 36 aligned drilled holes | |

DESCRIPTION

Figure 1:
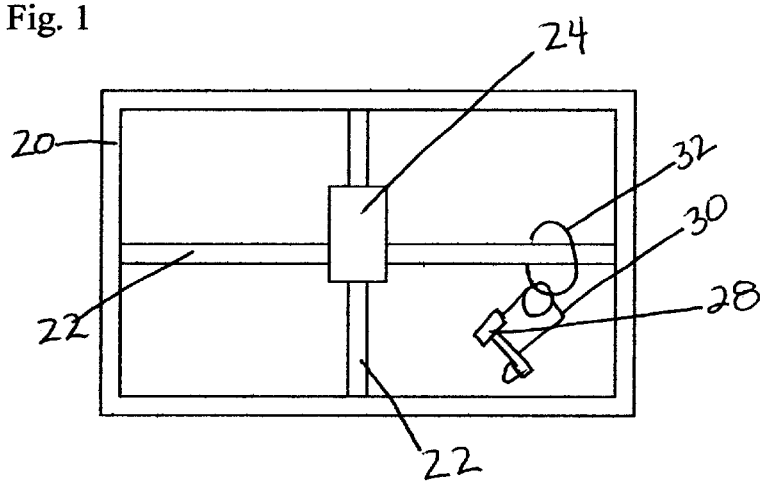
FIG. 1 is a complete frontal view of the pallet stabilizer attachment tool.

A pallet-stabilizing tool is generally indicated in FIG. 1. A frame 20 with centrally located internal support bars 22 illustrate the pressure point plate 24. Attached by wire 32 is the pin 28 with safety latch 30. The frame is made from metal tubing. It can be heated and bent at a ninety-degree angle to form a rectangular shape with four corners. Opposing ends are then welded together to form and complete the outer portion of the frame which has equally lengthened opposing sides. A frame can also be constructed by welding ends to create corners to form and complete the outer perimeter. Bars of metal tubing are welded within to complete the centrally located cross. The purpose of the frame and bars is to provide a rigid brace that rest against freight. A frame can be rotated to increase height or lengthen the width permitting use with one or two pallets of freight. Dimension of the frame may be increased or decreased to meet freight needs. Pallet stabilizers can be made from metal, steel, aluminum, or the like rigid materials of engineering choice.

Figure 2:
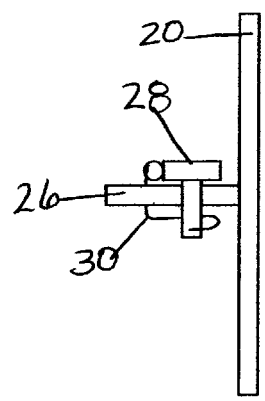
FIG. 2 is a side view illustrating the frame and insertion of the pin through the extension tubing.

FIG. 2 presents the side view of the frame 20, extension tubing 26, insertion of the pin 28, and safety latch 30. Extension tubing is diametrically smaller than a load-bar (not shown) and inserts into the load-bar system. The extension tubing has one set of aligned drilled holes 36. A pin with latch is then inserted through the drilled holes of the extension tubing and load-bar (not shown).

Figure 3:
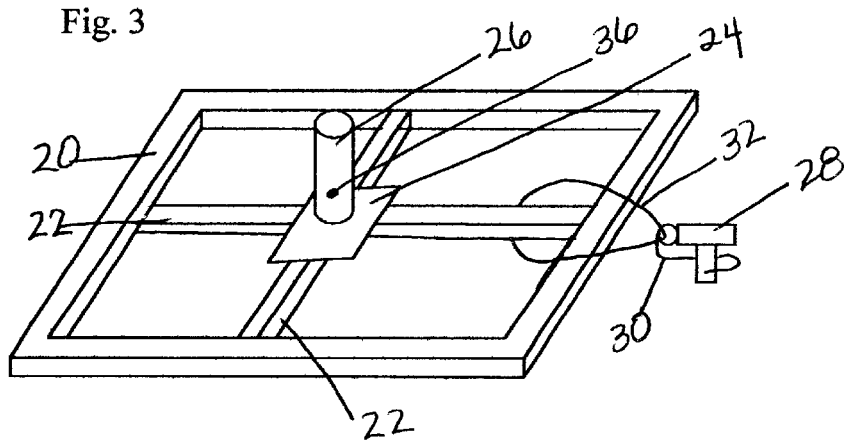
FIG. 3 shows an angled view that presents the functional design of the frame, center support bars, pressure point plate with extension tubing, and attachment of safety pin.

The angled view in FIG. 3 visualizes the tubing of the frame 20 and internal support bars 22. Centrally located is the pressure point plate 24 with extension tubing 26. Attached to a center support bar, by wire, is the safety-latching pin. Wire 32 is inserted through the loop of the safety latch 30, then wrapped around the support bar. The ends of the wire are then clamped 34 securing the pin 28 to the frame.

Figure 4:
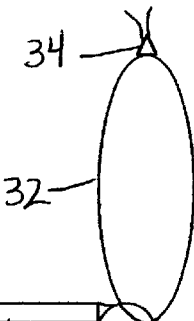
FIG. 4 shows the pressure point plate with circular tubing.
Figure 4:
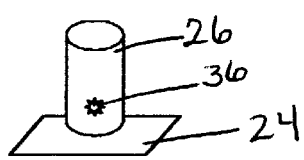

FIG. 4 represents the pressure point plate 24 with cylindrical metal extension tubing 26. The purpose of a metal plate allows attachment of squared or cylindrical tubing. Tubing is welded centrally on to the plate 24. This plate disburses the pressure that is created from the extension tubing and load-bar bracing system (not shown) Holes 36 are visualized and equally opposed. One set of opposing holes allows insertion of the pin 28.

Figure 5:
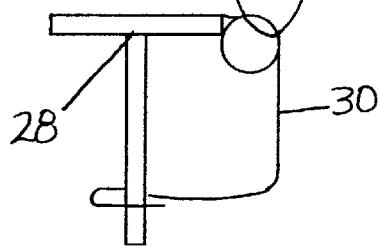
FIG. 5 is an exploded view of the removable pin with safety lock feature and the clamped wire that attaches the pin to the frame.

The pin 28 in FIG. 5 has a safety latch 30, attachment wire 32 and clamp 34. The pin is made of metal and the latch is made of thick wire. The thick wire is attached to the pin. It can be welded or drilled and inserted to the top of the pin. A loop is incorporated into the latch and assist in attachment to the frame 20. The bottom of the latch wraps around the bottom of the pin to prevent dislodging. Thin attachment wire 32 is threaded through the loop of the latch and around the frame. A clamp 34 secures the two wire ends together attaching the pin to the framed. The purpose of the pin is to secure the pallet stabilizer frame to a load-bar. The pin with latch can be made of any suitable material of any size that will insert into the extension tubing and load-bar.

CONCLUSION

Accordingly, the reader will see that the pallet stabilizer is an effective way to secure freight for companies that deliver and pick up goods on a daily basis. This attachment tool coupled with a pre-existing load-bar bracing system prevents freight from shifting sideways or laterally. The pallet stabilizer is a frame that rest against a pallet of freight or other types of freight. A load-bar connects to the frame extension tubing and is secured by a latching safety pin. When the load-bar is employed it telescopically extends, securing the frame to the pallet of freight or other freight, by tension across the pocket of empty space to the opposing wall. Furthermore, the pallet stabilizer has the additional advantages in that;

it is user friendly;

light weight;

strong and able to resist heavy weight;

can be used with oversized freight, boxed freight or pallets of freight;

Can secure more than one pallet at a time;

The presented pallet stabilizer is of simple construction. Each component can be made from substantially any suitable material of engineering choice, such as metal, iron, steel, aluminum, or any other rigid material. The invention has been herein shown and described in what is conceived to be the most practical and preferred embodiment. Modification to the inventive concepts may be apparent to those skilled in the art. Without departing from the spirit and scope of the invention, which is not limited to the details disclosed herein but is to be accorded the full scope of the claims so as to embrace any and all equivalent devices and apparatus's.

What is claimed is:

1. An apparatus for preventing freight from shifting laterally in cargo compartments with opposing walls, comprising:

a frame constructed of rigid material, containing center support bars, a pressure point plate, extension tubing, and latching safety pin, said center support bars providing central reinforcement of said frame, said pressure point plate centrally located within said frame and providing mounting and reinforcement for said extension tubing, said latching safety pin secures said extension tubing to a telescopically elongating load-bar system;

said extension tubing inserts and locks into said load-bar system that extends and is secured to at least on of the opposing walls;

said extension tubing couples manually to said load-bar system without the use of any tools and is secured by said latching pin.

2. An apparatus used with pre-existing load-bar systems for preventing freight from shifting laterally in a cargo compartment with opposing walls, comprising:

a frame, constructed of rigid material, containing center support bars, a pressure point plate, extension tubing and latching safety pin, said support bars providing central reinforcement of said frame, said pressure point plate located centrally within said framers and providing mounting and reinforcement of said extension tubing, said latching safety pin secures said extension tubing to a load-bar system;

said extension tubing inserts and locks to said load-bar system securing the freight against at least on of the opposing walls;

said extension tubing couples manually to said load-bar system without the use of any tools and is secured by said latching pin.

* * * * *